United States Patent
Kurata et al.

(10) Patent No.: US 7,934,490 B2
(45) Date of Patent: May 3, 2011

(54) START-UP CONTROL DEVICE AND START-UP CONTROL METHOD FOR INTERNAL COMBUSTION ENGINE

(75) Inventors: Naoki Kurata, Nishikamo-gun (JP); Tatsuhiko Akita, Okazaki (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 269 days.

(21) Appl. No.: 12/063,341

(22) PCT Filed: Apr. 11, 2007

(86) PCT No.: PCT/IB2007/000940
§ 371 (c)(1),
(2), (4) Date: Feb. 8, 2008

(87) PCT Pub. No.: WO2007/116304
PCT Pub. Date: Oct. 18, 2007

(65) Prior Publication Data
US 2010/0163004 A1 Jul. 1, 2010

(30) Foreign Application Priority Data
Apr. 12, 2006 (JP) .................. 2006-110037

(51) Int. Cl.
*F02G 5/00* (2006.01)
(52) U.S. Cl. ......... 123/543; 123/491; 123/554; 123/558
(58) Field of Classification Search .......... 123/543–547, 123/554, 557, 558, 491
See application file for complete search history.

(56) References Cited

U.S. PATENT DOCUMENTS

| 5,325,836 | A | * | 7/1994 | Orzel et al. | 123/478 |
| 5,533,486 | A | * | 7/1996 | Qutub | 123/541 |
| 6,568,371 | B2 | * | 5/2003 | Sato et al. | 123/478 |
| 2003/0034009 | A1 | * | 2/2003 | Yuya et al. | 123/436 |
| 2004/0069278 | A1 | * | 4/2004 | Okamoto et al. | 123/458 |
| 2005/0150219 | A1 | * | 7/2005 | Crawley et al. | 60/295 |
| 2007/0175459 | A1 | * | 8/2007 | Williams et al. | 123/575 |

FOREIGN PATENT DOCUMENTS

| JP | 6-173806 A | 6/1994 |
| JP | 8-61175 A | 3/1996 |
| JP | 8-505201 A | 6/1996 |
| JP | 9-250414 A | 9/1997 |
| JP | 11-44236 A | 2/1999 |
| JP | 2000-64874 A | 2/2000 |
| JP | 2000-110685 A | 4/2000 |

(Continued)

*Primary Examiner* — John T Kwon
(74) *Attorney, Agent, or Firm* — Sughrue Mion, PLLC

(57) ABSTRACT

An engine ECU stores a map in which three regions, that is, a high-temperature region, a low-temperature region, and a region therebetween, are prescribed. The pre-feed time T set when the present condition falls in the region is the longest. An engine ECU executes a program that includes the step of detecting an engine cooling water temperature THW when the start-up of the engine is requested, the step of executing the pre-feed until the fuel pressure P becomes equal to or greater than a fuel pressure threshold value P(TH), and the step of starting the cranking when the fuel pressure P becomes equal to or greater than the fuel pressure threshold value P(TH). Thus, the bad start-up caused by fuel vapor is avoided without operating the fuel pump unnecessarily for a long time.

8 Claims, 8 Drawing Sheets

FOREIGN PATENT DOCUMENTS

| | | |
|---|---|---|
| JP | 2005-42584 A | 2/2005 |
| WO | WO 01/44637 A2 | 6/2001 |
| WO | WO 03/012274 A1 | 2/2003 |
| WO | WO 03/038260 A1 | 5/2003 |

* cited by examiner

START-UP CONTROL DEVICE AND START-UP CONTROL METHOD FOR INTERNAL COMBUSTION ENGINE

The disclosure of Japanese Patent Application No. 2006-110037 filed on Apr. 12, 2006, including the specification, drawings and abstract is incorporated herein by reference in its entirety.

BACKGROUND OF THE INVENTION

1. Field of the Invention

The invention relates to a start-up control device and a start-up control method for an internal combustion engine equipped with a fuel injection mechanism (in-cylinder injection-purpose injector) that injects fuel toward the inside of a cylinder at high pressure, or an internal combustion engine equipped with a fuel injection mechanism (intake passageway injection-purpose injector) that injects fuel toward the inside of an intake port, or an internal combustion engine equipped with both of these fuel injection mechanisms. More particularly, the invention relates to a technology of operating a fuel pump before cranking.

2. Description of the Related Art

There is known a gasoline engine that is equipped with a first fuel injection valve (in-cylinder injection-purpose injector) for injecting fuel into the combustion chamber of the engine and a second fuel injection valve (intake passageway injection-purpose injector) for injecting fuel into the intake passageway, and that selectively injects fuel via the in-cylinder injection-purpose injector or the intake passageway injection-purpose injector in accordance with the rotation speed of the engine or the load of the engine. A direct-injection gasoline engine equipped merely with a fuel injection valve for injecting fuel into the combustion chamber of the engine (in-cylinder injection-purpose injector) is also known. Furthermore, a gasoline engine equipped merely with a fuel injection valve for injecting fuel into the intake passageway (intake passageway injection-purpose injector) has been known for a long time.

In a high-pressure fuel system that includes an in-cylinder injection-purpose injector, fuel whose pressure has been heightened by a high-pressure fuel pump is supplied to an in-cylinder injection-purpose injector via a delivery pipe, and then the in-cylinder injection-purpose injector injects high-pressure fuel into the combustion chamber of each cylinder of the engine.

A diesel engine having a common-rail type fuel injection system is also known. In the common-rail type fuel injection system, the fuel whose pressure has been heightened by a high-pressure fuel pump is stored in a common rail, and the high-pressure fuel is injected from the common rail into the combustion chamber of each cylinder of the diesel engine by opening and closing an electromagnetic valve.

In order to bring fuel associated with the engine to a high-pressure state, a high-pressure fuel pump is used in which a cylinder is driven by a cam that is linked to a crankshaft of the engine. Incidentally, an engine equipped only with an intake passageway injection-purpose injector does not include such a high-pressure fuel pump.

In any of the aforementioned engines (an engine equipped with an in-cylinder injection-purpose injector and an intake passageway injection-purpose injector, an engine equipped with in-cylinder injection-purpose injector alone, and an engine equipped with an intake passageway injection-purpose injector alone), a problem as stated below occurs when the engine is started again after having been left in a stopped state.

In any of the engines, the piping from the fuel tank to the injector is provided with an oil-tight structure. However, if fuel leakage occurs due to bad sealing, or if a foreign matter is caught in the fuel injection hole of the injector, fuel leakage from the injector occurs. Therefore, from the state where the engine is stopped, the pressure declines (the pressure of fuel declines below the saturated vapor pressure (there is a relevancy to the temperature of fuel)), the reduced-pressure boiling occurs, so that vapor occurs in the piping.

Furthermore, since the high-pressure fuel pump inevitably has a clearance of a pump plunger due to its structure, fuel leaks through the clearance. The fuel that has leaked through the clearance is returned to the fuel tank (atmospheric pressure) via a return pipe. Therefore, the pressure also declines from the state where the engine is stopped, so that the reduced-pressure boiling occurs and therefore fuel vapor occurs in the piping.

If fuel vapor occurs in the fuel piping as described above, the fuel vapor impedes the pressure in the fuel piping from promptly rising to the feed pressure, thus deteriorating the start-up characteristic of the engine. In any of the foregoing engines, a cause of the occurrence of fuel vapor is that the pressure in the fuel piping declines during a stop of the engine.

Japanese Patent Application Publication No. JP-A-6-173806 discloses an injection device of an internal combustion engine which avoids an event where normal injection of fuel from an injector becomes impossible in the case where the pressure in the fuel piping declines during a stop of the engine. This injection device of the internal combustion engine is an injection device of the internal combustion engine wherein a fuel injection valve that injects a desired amount of fuel into an intake passageway of the internal combustion engine by appropriately controlling the communication between the fuel supply opening and the fuel injection opening and a fuel pump that generates a fuel pressure by pumping up fuel from a fuel tank are interconnected in communication via a fuel path, and a fuel pressure regulator that keeps the fuel pressure in the fuel path below a predetermined value is provided in the fuel path, and wherein the fuel pressure supplied to the fuel supply opening of the fuel injection valve is kept at a constant level. The injection device includes a start-up prediction portion that detects a predetermined phenomenon that occurs prior to the start-up of the internal combustion engine, and predicts a start-up of the internal combustion engine on the basis of the detection of the phenomenon, and a fuel pressure raising portion that raises the fuel pressure in the fuel path if the start-up prediction portion predicts a start-up of the internal combustion engine.

According to this injection device of the internal combustion engine, when a predetermined phenomenon prior to a start-up of the internal combustion engine is detected (e.g., when it is detected that the driver's seat-side door is opened through the monitoring of the opening and closing state of the driver's seat-side door while the internal combustion engine is at a stop), the pressure in the fuel path is heightened in advance so that whenever the internal combustion engine is to be started up, a predetermined fuel pressure is supplied to the fuel injection valve. Therefore, unlike the related-art devices, the fuel injection amount at the time of starting up the internal combustion engine does not become unstable, so that good start-up characteristic of the internal combustion engine and good operation stability of the vehicle immediately following the start-up can be secured.

However, in the injection device of the internal combustion engine disclosed in Japanese Patent Application Publication No. JP-A-6-173806 mentioned above, when the driver's seat-side door is opened, it is judged that the engine is to be started, and the fuel pump is operated for a predetermined time to heighten the pressure of fuel in advance. However, operating the fuel pump for the fixed time uniformly as mentioned above does not appropriately corresponds to the actual state of occurrence of fuel vapor, and the fuel pump may be operated for unnecessarily long time. If this happens, there arises a problem of reduction of the service life of the fuel pump, or a problem of noise and vibration due to the unnecessarily long-time operation of the fuel pump prior to the start-up of the engine.

SUMMARY OF THE INVENTION

The invention has been accomplished in view of the aforementioned problems, and provides a start-up control device and a start-up control method for an internal combustion engine which are capable of precisely avoiding a bad start-up of the engine without operating the fuel pump for an unnecessarily long time before the cranking.

As one aspect of the invention, there is provided a start-up control device of an internal combustion engine which includes: a detector that detects a fuel temperature when a start-up of the internal combustion engine is requested; and a controller that pre-drives a fuel pump that supplies fuel, via a fuel piping, to a fuel injection valve that sends fuel into a combustion chamber of the internal combustion engine before the internal combustion engine is started up by injecting fuel from the fuel injection valve. The start-up control device is characterized in that the controller divides the fuel temperature into fuel temperature ranges based on the detected fuel temperature, and sets a pre-feed time during which the fuel pump is pre-driven, for each fuel temperature range divided.

According to another aspect of the invention, there is provided a start-up control method for an internal combustion engine. Specifically, the start-up control method includes:

detecting a fuel temperature when a start-up of the internal combustion engine is requested;

dividing the fuel temperature into fuel temperature ranges based on the detected fuel temperature;

setting a pre-feed time during which a fuel pump is pre-driven, for each divided fuel temperature range; and pre-driving the fuel pump that supplies fuel, via a fuel piping, to a fuel injection valve that sends fuel into a combustion chamber of the internal combustion engine before the internal combustion engine is started up by injecting fuel from the fuel injection valve.

According to the start-up control device and the start-up control method for an internal combustion engine as described above, a plurality of regions prescribed depending on the fuel temperature are set, taking the saturated vapor pressure of fuel into account. These regions are, for example, a high-temperature region, a low-temperature region, and an intermediate region between the two regions. These regions can be classified into a region in which there is occurrence of fuel vapor due to the relationship with the saturated vapor pressure of fuel, a region in which although there is occurrence of fuel vapor, there exists residual pressure, so that the fuel pressure can be promptly raised and thus a good start-up characteristic is realized even though the time (pre-feed time) for pre-driving the fuel pump prior to the start-up of the internal combustion engine is short, a region in which there is no occurrence of fuel vapor, etc. Then, by setting a pre-feed time on the basis of the fuel temperature, bad start-up of the engine can be precisely avoided without operating the fuel pump for unnecessarily long time prior to the cranking.

It is preferable that the controller of the start-up control device sets the pre-feed time so that the pre-feed time becomes long, and drives the fuel pump for the set pre-feed time, in the fuel temperature range in which it is judged that a degree of occurrence of fuel vapor in the fuel piping which affects a start-up characteristic of the internal combustion engine is great.

It is also preferable that start-up control method further includes setting the pre-feed time so that the pre-feed time becomes long, and driving the fuel pump for the set pre-feed time, in the fuel temperature range in which it is judged that a degree of occurrence of fuel vapor in the fuel piping which affects a start-up characteristic of the internal combustion engine is great.

Of the regions divided depending on the fuel temperature, that is, the high-temperature region, the low-temperature and the intermediate region, it is estimated that the high-temperature region and the intermediate region will find occurrence of fuel vapor in the fuel piping in relation to the saturated vapor pressure of fuel. Even if the fuel temperature is in the high-temperature region and there is occurrence of fuel vapor, high temperature is accompanied with high pressure, that is, relatively great residual pressure exists. Therefore, in the case where the present condition is in the high-temperature region, the fuel pressure can be promptly raised even if the time for pre-driving the fuel pump prior to the start-up of the engine is short; thus, good start-up characteristic can be realized. Therefore, in the high-temperature region, a short pre-feed time suffices even if there is occurrence of fuel vapor. On the other hand, in the low-temperature region, there is no occurrence of fuel vapor. Therefore, even if the pre-feed time is short, the fuel pressure is promptly raised, and thus a good start-up characteristic can be realized. Therefore, in the low-temperature region, since there is no occurrence of fuel vapor, the pre-feed time may be the shortest. In the intermediate region, however, there is occurrence of fuel vapor and there is no sufficient residual pressure. Therefore, if the pre-feed time is short, that is, if cranking is performed after the short-time pre-feed following the start-up request, time is needed for the fuel pressure to rise, and therefore good start-up characteristic cannot be realized. According to the start-up control device and start-up control method of the internal combustion engine as described above, the pre-feed time is set relatively long in the intermediate region in which it is determined that the degree of occurrence of vapor in the fuel piping which affects the start-up characteristic of the internal combustion engine is great. It is judged that the detected fuel temperature falls in the intermediate region among the plurality of regions prescribed in conjunction with the relationship between the fuel pressure and the saturated vapor pressure characteristic of fuel, it is estimated that there is occurrence of fuel vapor. If the vapor affects the start-up characteristic of the internal combustion engine, the pre-feed is executed for a specially long time before the cranking. This makes it possible to set a precise pre-feed time in connection with the state of occurrence of vapor that affects the start-up characteristic of the internal combustion engine. As a result, it is possible to provide a start-up control device for an internal combustion engine which is capable of precisely avoiding bad start-up without operating the fuel pump for an unnecessarily long time before the cranking.

In the start-up control device of the internal combustion engine, it is also preferable that there be provided three regions that are a first region in which the fuel temperature is high, a third region in which the fuel temperature is low, and a second region between the first region and the third region, and that if it is judged that the detected fuel temperature falls in the second region, the controller judges that the degree of occurrence of fuel vapor that affects the start-up characteristic of the internal combustion engine is great, and controls the pre-feed time so that the pre-feed time becomes relatively long.

In the start-up control method of the internal combustion engine, it is also preferable that there be provided three regions that are a first region in which the fuel temperature is high, a third region in which the fuel temperature is low, and a second region between the first region and the third region, and that if it is judged that the detected fuel temperature falls in the second region, it be judged that the degree of occurrence of fuel vapor that affects the start-up characteristic of the internal combustion engine is great, and the pre-feed time be controlled so that the pre-feed time becomes relatively long.

In the intermediate region between the high-temperature and high-pressure region and the low-temperature region, there is occurrence of fuel vapor and there is not a sufficient residual pressure. Therefore, if the pre-feed is not sufficiently performed, a time is needed for the fuel pressure to rise, and thus good start-up characteristic cannot be realized. According to the start-up control device and the start-up control method of the internal combustion engine as described above, by performing relatively long pre-feed in the intermediate region, good start-up characteristic can be realized while avoiding unnecessarily long-time operation of the fuel pump.

Furthermore, it is preferable that the detector further detects a fuel pressure, and the controller divides the fuel temperature and the fuel pressure based on the detected fuel temperature and the detected fuel pressure, and sets a pre-feed time during which the fuel pump is pre-driven, for each divided range of the fuel temperature and the fuel pressure.

It is also preferable that the start-up control method of the internal combustion engine further include:
  detecting a fuel pressure;
  dividing the fuel temperature and the fuel pressure based on the detected fuel temperature and the detected fuel pressure; and
  setting a pre-feed time during which the fuel pump is pre-driven, for each divided range of the fuel temperature and the fuel pressure.

According to the start-up control device and the start-up control method of the internal combustion engine as described above, the fuel pressure as well as the fuel temperature is detected and taken into account. There are a plurality of divided regions prescribed by the fuel temperature and the fuel pressure. For example, in the case where division is performed to form a high-temperature and high-pressure region, a low-temperature region, and an intermediate region therebetween, what is particularly important is a region in the intermediate region which is on the lower pressure side of the saturated vapor pressure curve of fuel. There is no occurrence of fuel vapor on the higher pressure side of the saturated vapor pressure curve. However, on the lower pressure side thereof, fuel vapor occurs and there is not sufficiently high residual pressure. Therefore, if the pre-feed time is short, that is, if the cranking is performed after a short-time pre-feed following the start-up request, it takes a time for the fuel pressure to rise, and therefore good start-up characteristic cannot be realized. At this time, by setting a pre-feed time during which the fuel pump is pre-driven for each of the ranges of fuel temperature and fuel pressure that are divided as described above, it becomes possible to take an appropriate measure in accordance with the state of the internal combustion engine.

Furthermore, in the start-up control device of the internal combustion engine, it is also preferable that the controller sets the pre-feed time so that the pre-feed time becomes long, and drives the fuel pump in the fuel temperature and fuel pressure range in which it is judged that the degree of occurrence of fuel vapor in the fuel piping which affects the start-up characteristic of the internal combustion engine is great.

The start-up control method of internal combustion engine preferably includes setting the pre-feed time so that the pre-feed time becomes long, and driving the fuel pump in the range of fuel temperature and fuel pressure in which it is judged that the degree of occurrence of fuel vapor in the fuel piping which affects the start-up characteristic of the internal combustion engine is great.

Taking into consideration the saturated vapor pressure of fuel, a plurality of regions prescribed by the fuel temperature and the fuel pressure, for example, a high-temperature and high-pressure region, a low-temperature region, and an intermediate region therebetween (in particular, a region in the intermediate region which is on the low-pressure side of the saturated vapor pressure curve of fuel is important) have been set. It is estimated that among these regions, the high-temperature and high-pressure region and the intermediate region will find occurrence of fuel vapor, in conjunction with the saturated vapor pressure of fuel. In the case where the present condition falls in the high-temperature and high-pressure region and there is occurrence of fuel vapor, residual pressure exists as can be seen from the fact that the pressure is high. Therefore, in the case where the present condition falls in the high-temperature and high-pressure region, the fuel pressure can be promptly raised even, if the time during which the fuel pump is pre-fed before the engine is started up. Thus, good start-up characteristic can be realized. Therefore, in the high-temperature and high-pressure region, a short pre-feed time suffices even if there is occurrence of fuel vapor. On the other hand, in the low-temperature region, there is no occurrence of fuel vapor. Therefore, even if the pre-feed time is short, the fuel pressure is promptly raised, and thus a good start-up characteristic can be realized. Therefore, in the low-temperature region, since there is no occurrence of fuel vapor, the pre-feed time may be the shortest. In the intermediate region, however, there is occurrence of fuel vapor and there is no sufficient residual pressure. Therefore, if the pre-feed time is short, that is, if cranking is performed after the short-time pre-feed following the start-up request, time is needed for the fuel pressure to rise, and therefore good start-up characteristic cannot be realized. Therefore, in the intermediate region, the pre-feed time is set relatively long. In particular, in a region in the intermediate region which is on the lower-pressure side of the saturated vapor pressure curve of fuel, there is considered to be great occurrence of fuel vapor, and the residual pressure is low. Therefore, it is desired that the pre-feed time be set to be the longest. In the start-up control device and the start-up control method of the internal combustion engine as described above, if it is judged that the detected fuel temperature and the detected fuel pressure fall in the intermediate region of a plurality of regions that are prescribed in conjunction with the relationship of the fuel temperature and fuel pressure with the saturated vapor pressure characteristic of fuel, it is estimated that there is occurrence of fuel vapor. Furthermore, if the fuel vapor affects the start-up characteristic of the internal combustion engine, the pre-feed is executed for a particularly long time before the cranking is performed. In this manner, a precise pre-feed time can be set in connection with the state of occurrence of vapor that affects the start-up characteristic of the internal combustion engine. As a result, it is possible to provide a start-up control device for an internal combustion engine which is capable of precisely avoiding bad start-up without operating the fuel pump for an unnecessarily long time before the cranking.

Furthermore, in the start-up control device of the internal combustion engine, it is also preferable that there be provided three regions that are a first region in which the fuel temperature is high, a third region in which the fuel temperature is low, and a second region between the first region and the third region, and that if it is judged that the detected fuel temperature and the detected fuel pressure fall in a region that is included in the second region and that is on a low-pressure side of a saturated vapor pressure curve of the fuel, the controller judges that the degree of occurrence of vapor that affects the start-up characteristic of the internal combustion engine is great, and control the pre-feed time so that pre-feed time becomes relatively long.

In the start-up control method of the internal combustion engine, it is also preferable that there be provided three regions that are a first region in which the fuel temperature is high, a third region in which the fuel temperature is low, and a second region between the first region and the third region, and that if it is judged that the detected fuel temperature and the detected fuel pressure fall in a region that is included in the second region and that is on a low-pressure side of a saturated vapor pressure curve of the fuel, it be judged that the degree of occurrence of vapor that affects the start-up characteristic of the internal combustion engine is great, and the pre-feed time be controlled so that pre-feed time becomes relatively long.

In the intermediate region between the high-temperature and high-pressure region and the low-temperature region, there is occurrence of fuel vapor and there is not a sufficient residual pressure. Therefore, if the pre-feed is not sufficiently performed, a time is needed for the fuel pressure to rise, and thus good start-up characteristic cannot be realized. Therefore, according to the start-up control device and the start-up control method of the internal combustion engine as described above, the pre-feed time is set to be long when the present condition falls in an intermediate region and the present pressure is lower than the saturated vapor pressure of the fuel. Therefore, in the intermediate region, a relatively long pre-feed is performed, and a good start-up characteristic is realized while avoiding unnecessarily long-time operation of the fuel pump.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which.

DETAILED DESCRIPTION OF THE PREFERRED EMBODIMENTS

Figure 1:
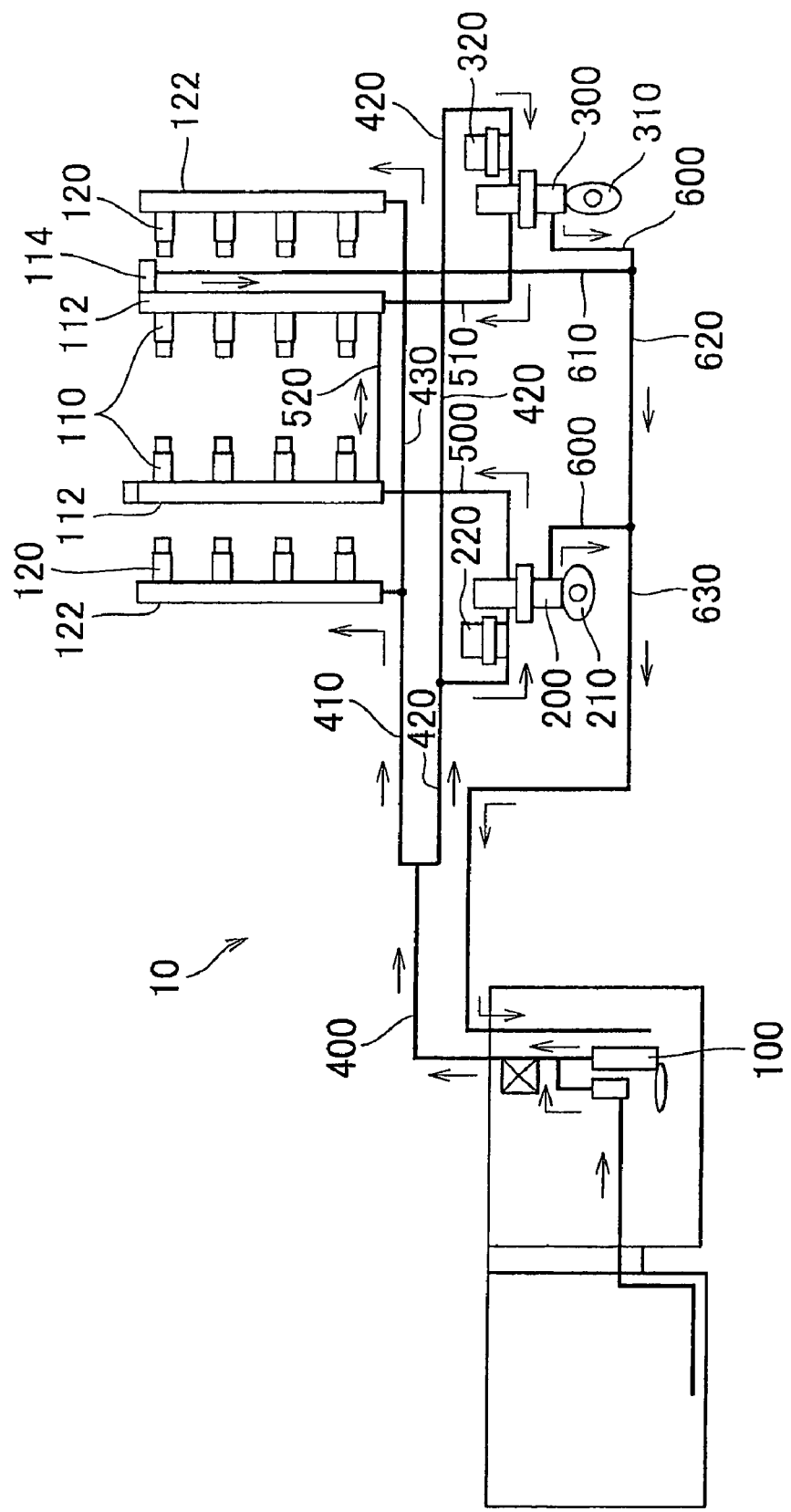
FIG. 1 is a schematic diagram of an overall construction of a fuel supply system in accordance with a first embodiment of the invention.

In the following description and the accompanying drawings, the present invention will be described in more detail with reference to exemplary embodiments.

In the following description, the same component parts are affixed with the same reference characters. The names and functions of those component parts are the same. Therefore, the description of the same component parts will be repeated.

Now, a first embodiment will be described. FIG. 1 shows a fuel supply system 10 that includes a start-up control device in accordance with the embodiment. This engine is a V-type 8-cylinder gasoline engine, and has an in-cylinder injection-purpose injector 110 that injects fuel into each cylinder, and an intake passageway injection-purpose injector 120 that injects fuel into the intake passageway of each cylinder. The invention is not applied exclusively to such an engine, but may also be applied to other types of gasoline engines, common-rail type diesel engines, etc. Therefore, the number of the high-pressure fuel pumps is not limited to two.

In particular, the engine may be an engine that has intake passageway injection-purpose injectors alone, or may also be an engine that has in-cylinder injection-purpose injectors alone. As for an engine having an injector, there is possibility of leakage of fuel from the injector. Due to the fuel leakage, it can happen that the pressure within the piping reduces and fuel vapor occurs. Therefore, a control of precisely judging whether fuel vapor has occurred and of pre-feeding fuel only when the pre-feeding is necessary is effective. Furthermore, in the case of an engine having an in-cylinder injection-purpose injector, the presence of a clearance of the pump plunger of a high-pressure fuel pump makes it impossible to maintain an oil-tight structure, and therefore, there is increased possibility of occurrence of reduced pressure and therefore occurrence of fuel vapor. Thus, it can be said that the invention is more effect for such engines having in-cylinder injection-purpose injectors.

As shown in FIG. 1, the fuel supply system 10 includes a fuel feed pump 100 that is provided in a fuel tank and that supplies fuel at a low ejection pressure (about 400 kPa, which is equal to the pressure regulator pressure), a first high-pressure fuel pump 200 driven by a first cam 210, a second high-pressure fuel pump 300 driven by a second cam 310 that is different in the phase of ejection from the first cam 210, high-pressure delivery pipes 112 provided individually for right and left banks of the engine in order to supply high-pressure fuel to in-cylinder injection-purpose injectors 110, four in-cylinder injection-purpose injectors 110 being provided on each of the right and left-bank high-pressure delivery pipes 112, and low-pressure delivery pipes 122 provided individually for the right and left banks in order to supply fuel to intake passageway injection-purpose injectors 120, four intake passageway injection-purpose injectors 120 being provided on each of the right and left-bank low-pressure delivery pipes 122.

The engine including this fuel supply system 10 is controlled by an engine ECU (Electronic Control Unit). The engine ECU includes a CPU (Central Processing Unit) as a computing device, and a memory as a storage device, although not shown. The CPU executes programs described below, and the memory stores maps described below.

An ejection opening of the fuel feed pump 100 is connected to a low-pressure supply pipe 400. The low-pressure supply pipe 400 branches into a first low-pressure delivery communication pipe 410, and a pump supply pipe 420. The first low-pressure delivery communication pipe 410 on the downstream side of a branching point to the low-pressure delivery pipe 122 for one of the two banks form a second low-pressure delivery communication pipe 430, which is connected to the low-pressure delivery pipe 122 for the other bank.

The pump supply pipe 420 is connected to an entrance of the first high-pressure fuel pump 200 and an entrance of the second high-pressure fuel pump 300. A first pulsation damper 220 is provided slightly upstream of the entrance of the first high-pressure fuel pump 200, and a second pulsation damper 320 is provided slightly upstream of the entrance of the second high-pressure fuel pump 300, so as to reduce the pulsation of fuel.

The ejection opening of the first high-pressure fuel pump 200 is connected to a first high-pressure delivery communication pipe 500. The first high-pressure delivery communication pipe 500 is connected to the high-pressure delivery pipe 112 of one of the banks of the V-shape bank configuration. The ejection opening of the second high-pressure fuel pump 300 is connected to a second high-pressure delivery communication pipe 510. The second high-pressure delivery communication pipe 510 is connected to the high-pressure delivery pipe 112 of the other bank of the V-shape bank configuration. The high-pressure delivery pipe 112 of one of the two banks of the V-shape bank configuration and the high-pressure delivery pipe 112 of the other bank are interconnected by a high-pressure communication pipe 520.

A relief valve 114 provided in one of the high-pressure delivery pipes 112 is connected to a high-pressure fuel pump return pipe 600 via a high-pressure delivery return pipe 610. A return opening of each of the high-pressure fuel pump 200 and the high-pressure fuel pump 300 is connected to a high-pressure fuel pump return pipe 600. The high-pressure fuel pump return pipes 600 are connected to a return pipe 620 and a return pipe 630, and are connected to the fuel tank.

Figure 2:
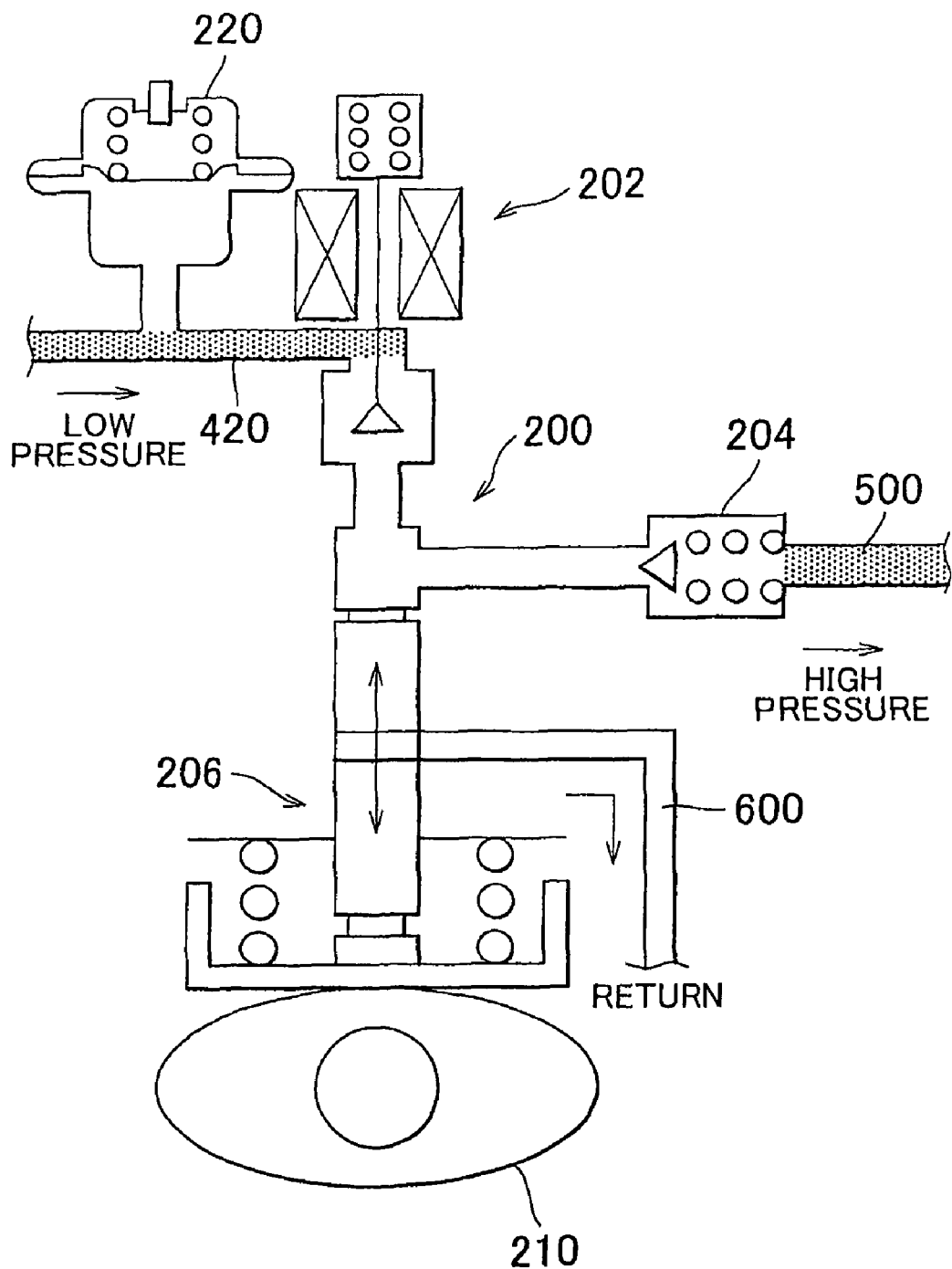
FIG. 2 is an enlarged partial view of the system shown in FIG. 1.

FIG. 2 shows an enlarged view of the first high-pressure fuel pump 200 shown in FIG. 1, and its vicinities. The second high-pressure fuel pump 300 is substantially the same as the first high-pressure fuel pump 200, but is different in the phase of the cam. That is, the phases of ejection timing of the two pumps are shifted from each other to restrain occurrence of pulsation. Furthermore, the characteristics of the first high-pressure fuel pump 200 and the second high-pressure fuel pump 300 may be the same or different from each other. In the following description, it is assumed that the ejection capabilities of the first high-pressure fuel pump 200 and the second high-pressure fuel pump 300 are the same in terms of specifications, but the control characteristics thereof are different due to their individual differences.

The high-pressure fuel pump 200 has, as main component parts, a pump plunger 206 that is slidingly driven up and down by the cam 210, an electromagnetic spill valve 202 and a leak function-equipped check valve 204.

When the pump plunger 206 is moving downward in accordance with the cam 210 and the electromagnetic spill valve 202 is open, fuel is introduced (sucked in). The amount of fuel ejected from the high-pressure fuel pump 200 is controlled by altering the timing of closing the electromagnetic spill valve 202 while the pump plunger 206 is moving upward in accordance with the cam 210. The earlier the timing of closing the electromagnetic spill valve 202 during the pressurization stroke in which the pump plunger 206 is moving upward, the more fuel is ejected. The more retarded the timing, the less fuel is ejected. The drive duty ratio of the electromagnetic spill valve 202 in the case where the greatest amount of fuel is ejected is assumed as 100%. The drive duty ratio of the electromagnetic spill valve 202 in the case where the smallest amount of fuel is ejected is assumed as 0%. If the drive duty ratio of the electromagnetic spill valve 202 is 0%, the electromagnetic spill valve 202 assumes a state where the valve does not close but remains open. Therefore, as long as the first cam 210 is rotating (as long as the engine is rotating), the pump plunger 206 slides in the up-down direction, but fuel is not pressurized since the electromagnetic spill valve 202 does not close.

The pressurized fuel pushes open the leak function-equipped check valve 204 (whose set pressure is about 60 kPa), and is fed to the high-pressure delivery pipe 112 via the first high-pressure delivery communication pipe 500. At this time, the fuel pressure is feedback-controlled via a fuel pressure sensor that is provided in the high-pressure delivery pipe 112. Furthermore, as mentioned above, the high-pressure delivery pipe 112 of one of the banks of the V-shape configuration and the high-pressure delivery pipe 112 of the other bank are interconnected in communication by the high-pressure communication pipe 520.

The leak function-equipped check valve 204 is a valve obtained by providing an ordinary check valve with a narrow hole, which is always open. Therefore, if the pressure of fuel on the first high-pressure fuel pump 200 (pump plunger 206) side becomes lower than the pressure of fuel within the first high-pressure delivery communication pipe 500 (for example, the engine stops and the cam 210 stops while the electromagnetic spill valve 202 remains open), high-pressure fuel in the first high-pressure delivery communication pipe 500 returns through the narrow hole to the first high-pressure fuel pump 200 side, so that the pressure in the first high-pressure delivery communication pipe 500 and the high-pressure delivery pipe 112 declines. Therefore, for example, when the engine is at a stop, the pressure of fuel in the high-pressure delivery pipe 112 is not high, so that the fuel leakage from the in-cylinder injection-purpose injector 110 can be avoided.

The amount of control used for the feedback control of the high-pressure fuel pump 200 is calculated from an integral term that is updated in accordance with an actual fuel pressure, a target value thereof, and a deviation, and a proportional that is increased or reduced in order to achieve a deviation of "0" between the actual fuel pressure and the target value, etc. If this control amount becomes great, the fuel ejection amount of the first high-pressure fuel pump 200 increases and the fuel pressure becomes high. Conversely, if the control amount becomes small, the fuel ejection amount of the first high-pressure fuel pump 200 declines and the fuel ejection pressure becomes low.

If the actual fuel pressure becomes excessively higher than the target value, both the integral term and the proportional term are made small so as to reduce the actual fuel pressure to the target value. However, an amount of time is needed in order to reduce the fuel pressure. Therefore, the integral term becomes excessively small while the actual fuel pressure is being reduced to the target value. If the integral term becomes excessively small, a so-called undershoot occurs in which after the actual fuel pressure reaches the target value, the fuel pressure cannot be kept at the target value but further declines.

More specifically, the engine ECU drives and controls the in-cylinder injection-purpose injectors 110 on the basis of the final amount of fuel injection, and controls the amount of fuel injected from the in-cylinder injection-purpose injectors 110. The amount of fuel injected from each in-cylinder injection-purpose injector 110 (fuel injection amount) is determined by the fuel pressure in the high-pressure delivery pipe 112 and the fuel injection duration. Therefore, in order to obtain a proper fuel injection amount, it is necessary to maintain a proper value of fuel pressure. Therefore, the engine ECU maintains a proper value of the fuel pressure P by feedback-controlling the fuel ejection amount of the high-pressure fuel pump 200 so that the fuel pressure determined on the basis of the detection signal from the fuel pressure sensor approaches a target fuel pressure P(0) that is set in accordance with the operation state of the engine. Incidentally, the fuel ejection amount of the high-pressure fuel pump 200 is feedback-controlled by adjusting the closed valve period (valve closure start timing) of the electromagnetic spill valve 202 on the basis of a duty ratio DT described below, as mentioned above.

The duty ratio DT, that is, a control amount for controlling the fuel ejection amount of the high-pressure fuel pump 200 (the valve closure start timing of the electromagnetic spill valve 202), will be described. The duty ratio DT is a value that changes between 0 and 100% and that is relevant to the cam angle of the cam 210 that corresponds to the closed valve period of the electromagnetic spill valve 202. That is, with regard to this cam angle, if the cam angle (maximum cam angle) that corresponds to the maximum closed valve period of the electromagnetic spill valve 202 is expressed as "θ(0)" and the cam angle (target cam angle) that corresponds to the target value of the closed valve period is expressed as "θ", the duty ratio DT represents the proportion of the target cam angle θ to the maximum cam angle θ(0). Therefore, the duty ratio DT is set at a value which is made closer to 100% as the targeted closed valve period (valve closure start timing) of the electromagnetic spill valve 202 approaches the maximum closed valve period and which is made closer to 0% as the targeted closed valve period approaches "0".

As the duty ratio DT becomes closer to 100%, the valve closure start timing of the electromagnetic spill valve 202 adjusted on the basis of the duty ratio DT is more advanced, and the closed valve period of the electromagnetic spill valve 202 becomes longer. As a result, the fuel ejection amount of the high-pressure fuel pump 200 increases, and the fuel pressure P rises. Furthermore, as the duty ratio DT becomes closer to 0%, the valve closure start timing of the electromagnetic spill valve 202 adjusted on the basis of the duty ratio DT is more retarded, and the closed valve period of the electromagnetic spill valve 202 becomes shorter. As a result, the fuel ejection amount of the high-pressure fuel pump 200 decreases, and the fuel pressure P declines.

Figure 3:
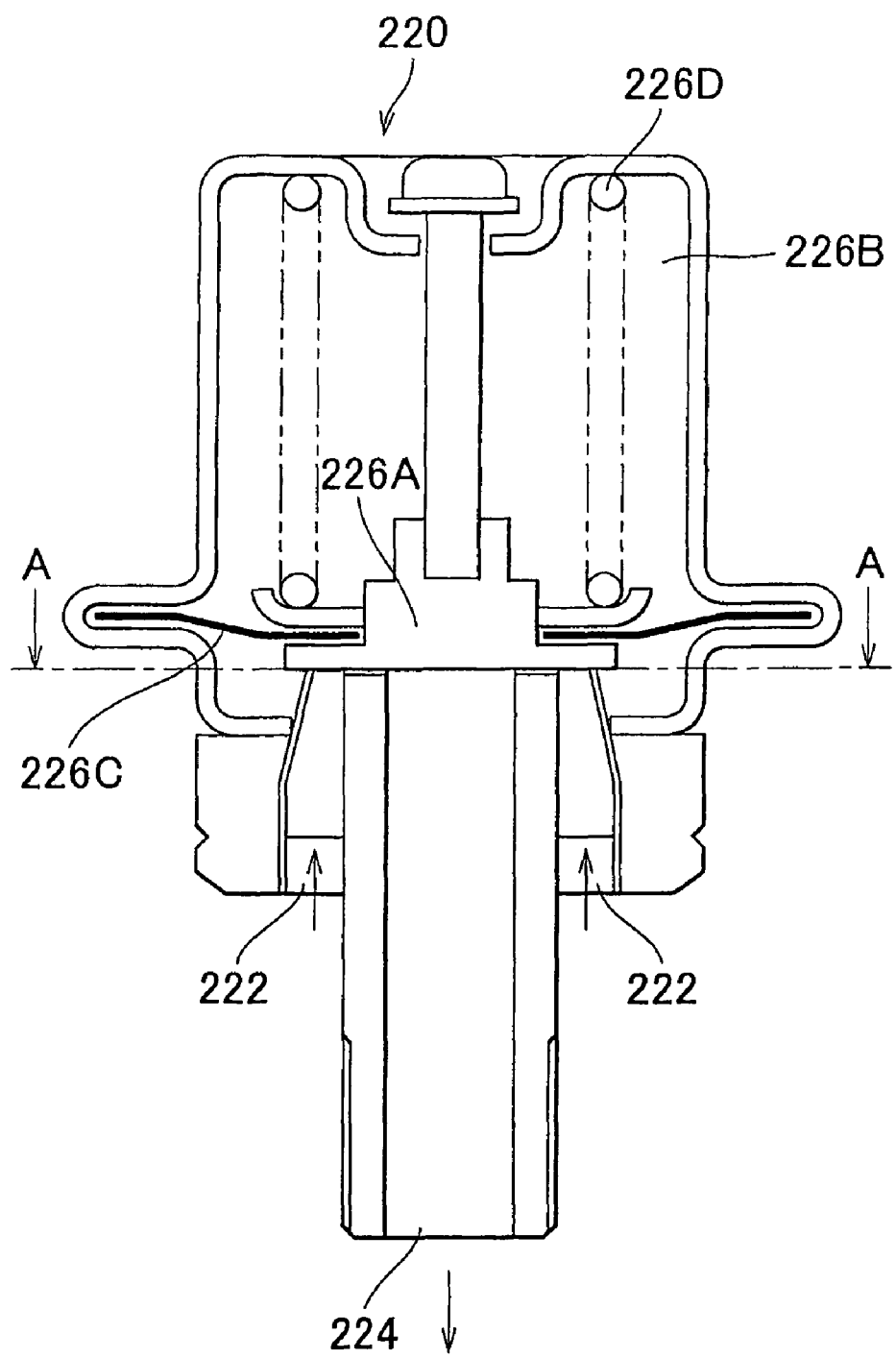
FIG. 3 is a sectional view of a pulsation damper shown in FIG. 1.

With reference to FIG. 3, the pulsation dampers shown in FIG. 1 will be described. In the following description, the pulsation damper 220 of the first high-pressure fuel pump 200 side will be described, and the pulsation damper 320 on the second high-pressure fuel pump 300 side will not be described since the pulsation damper 320 has the same structure as the first pulsation damper 220.

The pulsation damper 220 is a diaphragm-type pulsation damper. The pulsation damper 220 has a diaphragm 226C that is provided for partition into a member that forms an inlet opening 222 and an outlet opening 224, and an air chamber 226B communicating with the atmosphere. The diaphragm 226C is supported by a spring 226D that is disposed in the air chamber 226B. In the case where the pressing force by the spring 226D is higher than the pressure of fuel introduced from the inlet opening 222, the member that forms the inlet opening 222 and the outlet opening 224 tightly contacts a pressure contact member 226A.

The pulsation damper 220 is provided on an intermediate portion of the pump supply pipe 420 which is on the upstream side of the high-pressure fuel pump 200. An upstream side of the pump supply pipe 420 is connected to the inlet opening 222 of the pulsation damper 220, and a downstream side of the pump supply pipe 420 is connected to the outlet opening 224 thereof.

In the case where in the first high-pressure fuel pump 200, the pump plunger 206 rises while the electromagnetic spill valve 202 is open, the pulsation that occurs in the pump supply pipe 420 due to the fuel ejected back from the first high-pressure fuel pump 200 propagates to the first pulsation damper 220, so that the pulsation can be reliably reduced by vibrations of the diaphragm 226C against the spring 226D in the pulsation damper 220.

Figure 4:
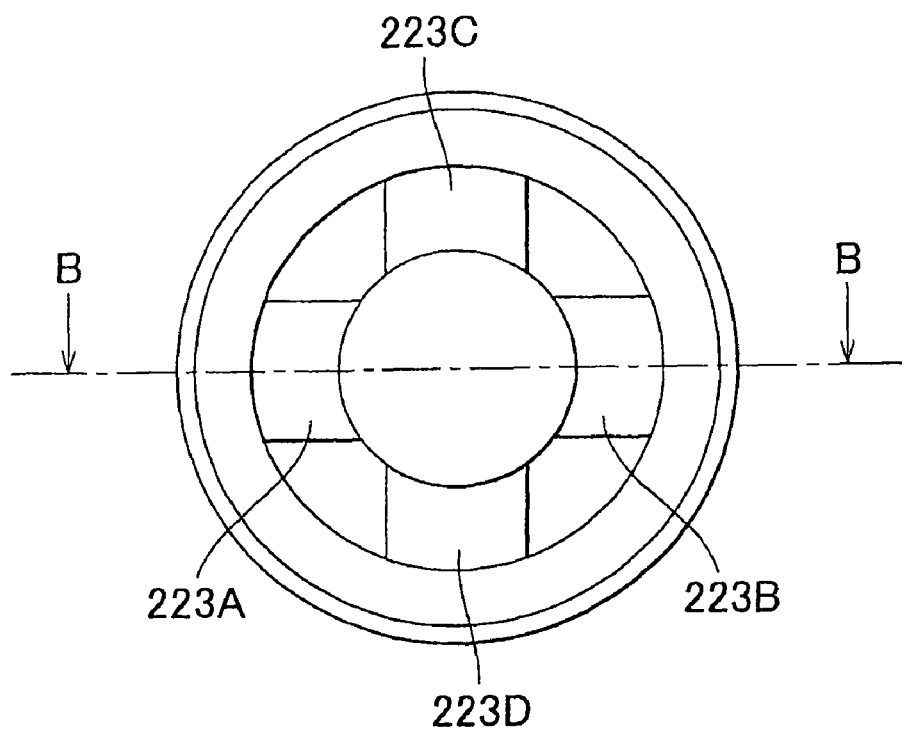
FIG. 4 is a sectional view taken on line A-A in FIG. 3.
Figure 5:
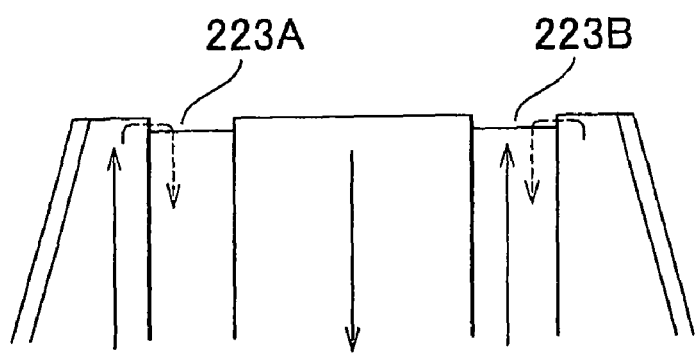
FIG. 5 is a sectional view taken on line B-B in FIG. 4.

FIG. 3 shows a sectional view of the pulsation damper 220. FIG. 4 shows a sectional view taken on line A-A in FIG. 3. FIG. 5 shows a sectional view taken on line B-B in FIG. 4.

As shown in FIGS. 3 to 5, the pulsation damper 220 has a groove 223A, a groove 223B, a groove 223C and a groove 223D that are formed in an end surface (an upper surface in FIG. 5) that the pressure contact member 226A of the pulsation damper 220 contacts. Therefore, in the case where the feed pressure is low, the pressure contact member 226A is put into pressing contact with the upper surface of the member that forms the inlet opening 222 and the outlet opening 224. Thus, the provision of the groove 223A, the groove 223B, the groove 223C and the groove 223D realizes a structure in which even if the pressure contact member 226A is put into pressing contact by the spring 226D, the fuel fed via the inlet opening 222 (the fuel feed pump 100 side) flows into the outlet opening 224 (the high-pressure fuel pump side) as shown by dotted lines in FIG. 5.

In particular, at the time of start-up of a direct-injection engine that has in-cylinder injection-purpose injectors alone, the fuel feeding by a high-pressure fuel pump cannot be performed until the engine starts rotating, and therefore low-pressure fuel is fed to the in-cylinder injection-purpose injector by the fuel feed pump 100 until the engine starts rotating. Therefore, the pulsation damper is provided with grooves for communication between the high-pressure piping system and the low-pressure piping system.

Incidentally, the pulsation damper 220 is provided for preventing the pulsation in the piping of the low-pressure system which occurs due to the action of the high-pressure fuel pump 200, and is normally not provided for an engine that has intake passageway injection-purpose injectors alone. In the application of the invention to an engine that has intake passageway injection-purpose injectors alone, it is appropriate to apply the invention on the condition that there is no in-cylinder injection-purpose injector nor a high-pressure piping system (that includes a pulsation damper as well).

Figure 6:
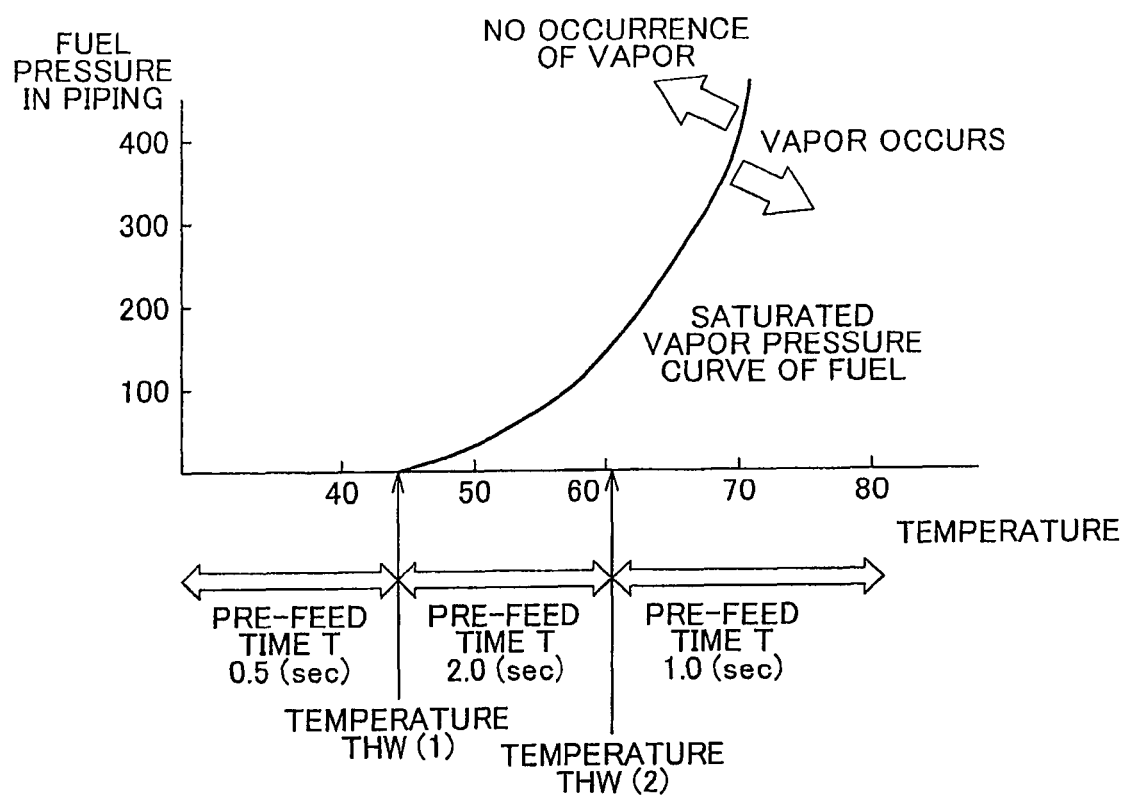
FIG. 6 is a diagram showing a relationship between the temperature of fuel and the pressure of fuel in a piping in accordance with the first embodiment of the invention.

With reference to FIG. 6, a relationship between the temperature of fuel and the pressure of fuel in the piping will be described. In FIG. 6, changes in the temperature and the pressure of fuel when a warmed-up engine has been stopped and left are indicated by a solid-line curve. Furthermore, the solid-line curve in FIG. 6 is a saturated vapor pressure curve. In FIG. 6, no fuel vapor does not occur in a region in which the pressure is above the saturated vapor pressure curve of the fuel represented by the solid line, and fuel vapor occurs in a region in which the pressure is below the saturated vapor pressure curve.

With regard to this saturated vapor pressure curve of fuel, a pre-feed time T is determined by the temperature of fuel (substituted by the engine cooling water temperature) in this embodiment. If the detected temperature of fuel is lower than a temperature THW(1) (<THW(2)), the pre-feed time T is at 0.5 sec. If the detected temperature of fuel is between the temperature THW(1) and the temperature THW(2), the pre-feed time T is set at 2.0 sec. If the detected temperature of fuel is higher than the temperature THW(2), the pre-feed time T is set at 1.0 sec. Incidentally, in the related-art start-up control devices, the pre-feed time T is uniformly 2.0 sec.

The aforementioned setting is a mere example, that is, the invention is not limited by this setting of the pre-feed time T. This setting of the pre-feed time T is based on the following reasons.

If the fuel temperature is higher than the temperature THW(2), the possibility of occurrence of fuel vapor is high, as can be seen from the saturated vapor pressure curve of fuel. However, the pre-feed time T (=1.0 sec) for the range exceeding the temperature THW(2) is shorter than the pre-feed time T (=2.0 sec) set for the range between the temperature THW(1) and the temperature THW(2). The pressure of fuel is sufficiently high (as compared with the other cases prescribed by the other temperature zones of fuel), and there is residual pressure. In this case, the fuel pressure promptly rises to a desired level (the pressure needs to be raised merely by the difference between the desired pressure and the residual pressure) at the first action of fuel injection at the time of start-up initiation without a need to perform the pre-feed (operate the fuel feed pump 100 before cranking). Therefore, a relatively short pre-feed time T suffices.

In the case where the temperature of fuel is lower than the temperature THW(1), the temperature of fuel and the pressure of fuel are sufficiently low. Due to the low fuel temperature, there is less occurrence (or no occurrence) of fuel vapor by reduced-pressure boiling, and no problem arises regarding the start-up characteristic of the engine. In this case, even if the pre-feed time for operating the feed pump 100 is shortened, the pressure of fuel promptly rises since there is no influence of occurrence of fuel vapor.

In the range between the temperature THW(1) and the temperature THW(2), the pressure of fuel has declined with the fuel temperature being high, and thus the reduced-pressure boiling is likely to occur. In this case, if the cranking is performed for a relatively short time of pre-feed, the pressure of fuel does not promptly rise since fuel vapor has occurred. At this times, a problem occurs in conjunction with the start-up characteristic of the engine. Therefore, by performing pre-feed for a relatively long time of 2.0 sec., the deterioration of the start-up characteristic can be avoided. The map shown in FIG. 6 is a mere example, and the invention is not limited to this map.

Figure 7:
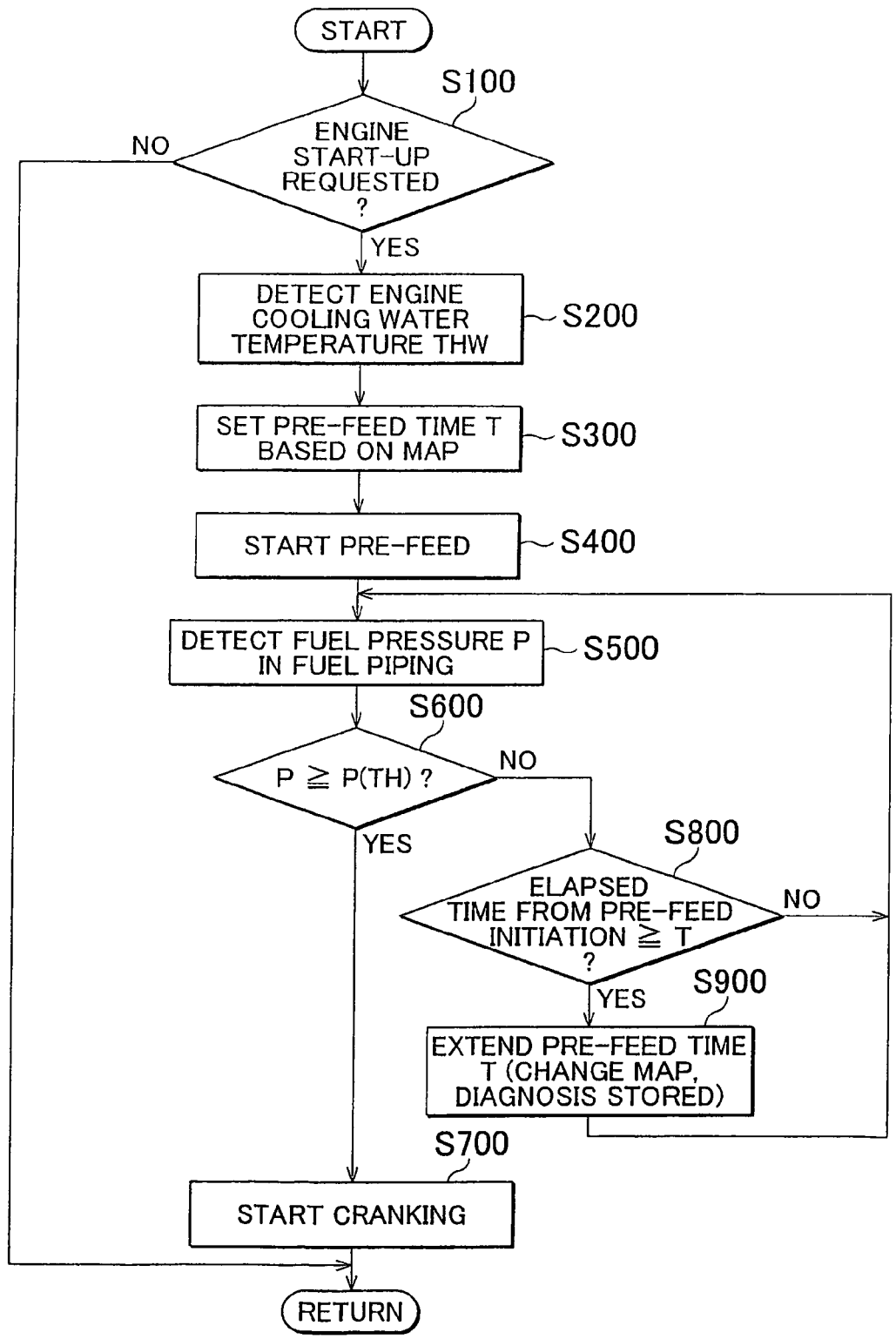
FIG. 7 is a flowchart showing a control structure of a program executed by an engine ECU that controls the fuel supply system that includes a start-up control device in accordance with the first embodiment of the invention.

With reference to FIG. 7, a control structure of a program executed by the engine ECU, which is a start-up control device in accordance with this embodiment. The program (sub-routine) shown by the flowchart is repeatedly executed with a predetermined cycle time (e.g., 80 msec).

In step (hereinafter, referred to as "S") 100, the engine ECU judges whether or not an engine start-up request has been detected. The engine start-up request is detected as an engine start button is depressed, or as the ignition switch is turned. When the engine start request is detected (YES in S100), the process proceeds to S200. If there is no such detection (NO in S100), this process ends (since this process is arranged as a sub-routine, the monitoring of an engine start request is performed in real time).

In S200, the engine ECU detects an engine cooling water temperature THW. The engine cooling water temperature THW is detected on the basis of a signal input to the engine ECU from a water temperature sensor provided in a cooling water passageway for cooling engine. In this embodiment, although the fuel temperature is substituted by the engine cooling water temperature THW, the invention is not limited to this construction.

In S300, the engine ECU sets a pre-feed time T on the basis of the map shown in FIG. 6 and the detected water temperature THW.

In S400, the engine ECU starts the pre-feed. Concretely, the engine ECU outputs a operation command signal to the fuel feed pump 100.

In S500, the engine ECU detects the fuel pressure P in the fuel piping. In S600, the engine ECU judges whether or not the detected fuel pressure P is greater than or equal to a fuel pressure threshold value P(TH). The fuel pressure threshold value P(TH) is set at a fuel pressure that does not cause a problem related to the startup characteristic of the engine. If the detected fuel pressure P is greater than or equal to the fuel pressure threshold value P(TH) (YES in S600), the process proceeds to S700. If not (NO in S600), the process proceeds to S800.

In S700 (following YES in S600), the engine ECU starts the cranking. Concretely, the engine ECU outputs an operation command signal to the starter motor.

In S800, the engine ECU judges whether or not the elapsed time following the start of the pre-feed is greater than or equal to the pre-feed time T set in S300. If the elapsed time following the start of the pre-feed is greater than or equal to the pre-feed time T (YES in S800), the process proceeds to S900. If not (NO in S800), the process returns to S500.

In S900, the engine ECU extends the pre-feed time T set in S300. Incidentally, at this time, the map used to set the pre-feed time T in S300 may be changed, or the fact that fuel pressure did not rise may be stored as diagnosis data. After that, the process returns to S500.

If the fuel pressure P does not rise to or above fuel pressure threshold value P(TH) although the pre-feed time has been repeatedly extended, it may be considered as an abnormality in the fuel system, and an abnormality process may be executed.

The action of the engine at the time of startup which is controlled by the engine ECU, which is the start-up control device in accordance with the embodiment, on the basis of the foregoing structure and the foregoing flowchart will be described.

If there is a request for start-up of the engine in a state of being left after being warmed up (YES in S100), the engine cooling water temperature THW is detected (S200). On the basis of this and the map shown in FIG. 6, the pre-feed time T is set (S300). Then, the pre-feed is started, and the fuel feed pump 100 is operated for the pre-feed time T (S400).

Due to the fuel ejected from the fuel feed pump 100, the fuel vapor occurring within the fuel piping is pressurized and therefore disappears. After that, the fuel pressure rises. After the fuel pressure P detected in the fuel piping becomes greater than or equal to a fuel pressure threshold value P(TH) (YES in S600), the cranking is started (S700). At this time, the fuel pressure has become equal to or higher than a pressure that allows good startup of the engine. Therefore, the engine is started up without occurrence of a bad startup of the engine.

Incidentally, if the pre-feed time T has elapsed (YES in S800) before the fuel pressure P becomes equal to or greater than the fuel pressure threshold value P(TH) (NO in S600), the pre-feed time T is extended (S900).

Furthermore, in the case where the engine cooling water temperature THW is higher than THW(2), there is occurrence of fuel vapor in the fuel piping but there is residual pressure. Therefore, even if the pre-feed time T is short, the fuel pressure promptly rises to or above a pressure that allows the good start-up of the engine.

Furthermore, in the case where the engine cooling water temperature THW is lower than THW(1), the temperature is sufficiently low, and no fuel vapor occurs in the fuel piping. Therefore, although the pre-feed time T is even shorter, the fuel pressure promptly rises to or above a pressure that allows the good start-up of the engine.

Thus, the pre-feed time T is varied depending on the engine cooling water temperature THW to execute the pre-feed. Therefore, it is possible to start up the engine without occurrence of bad start-up while avoiding the operation of the fuel feed pump 100 with an unnecessarily long pre-feed time.

Thus, according to the start-up control device of the engine in accordance with this embodiment, it is judged whether or not there is an amount of fuel vapor that truly affects the start-up characteristic of the engine, on the basis of the temperature of fuel. Then, the pre-feed is executed so that the pre-feed time is made longer the greater the degree of occurrence of the fuel vapor that affects the start-up characteristic of the engine. Therefore, the pre-feed performed for an unnecessarily long time can be avoided. Thus, the problem of useless shortening of the service life of the fuel feed pump, the problem of noise and vibration caused by the operation of the fuel feed pump during a stop of the engine, etc., can be avoided.

Next, a second embodiment of the invention will be described. It is to be noted herein that a fuel supply system 10 that includes a start-up control device in accordance with this embodiment has substantially the same structure as the structure of the first embodiment show in FIGS. 1 to 5. Therefore, detailed description of the same structure thereof will not be repeated.

Figure 8:
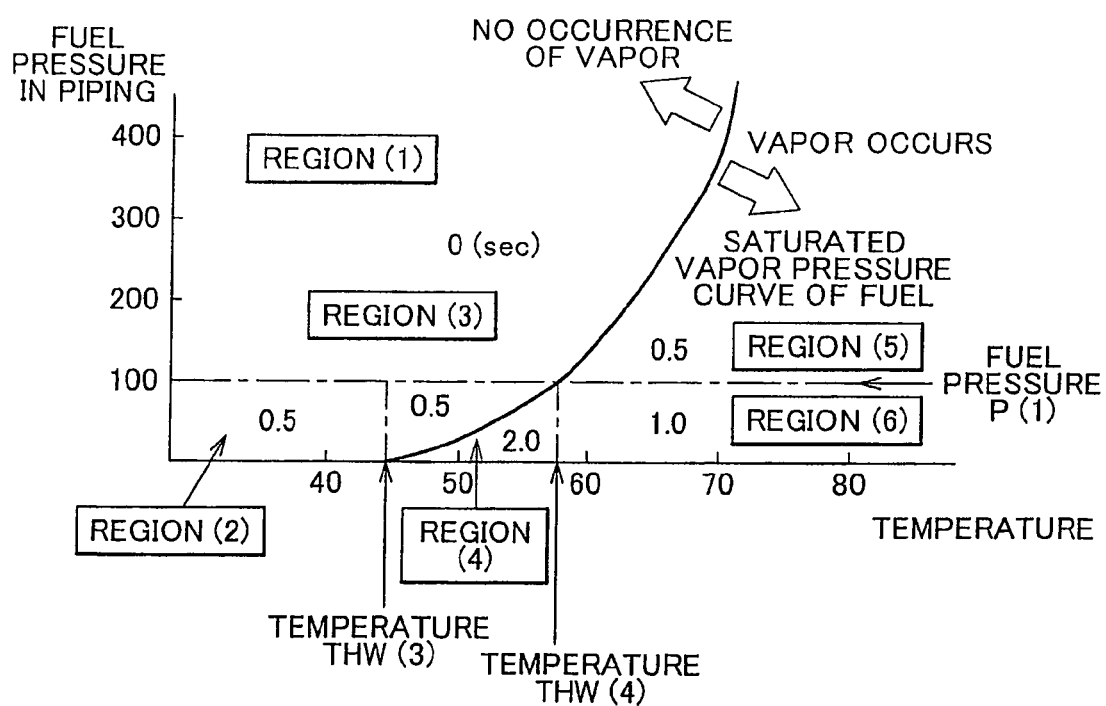
FIG. 8 is a diagram showing a relationship between the temperature of fuel and the pressure of fuel in a piping in accordance with a second embodiment of the invention.
Figure 9:
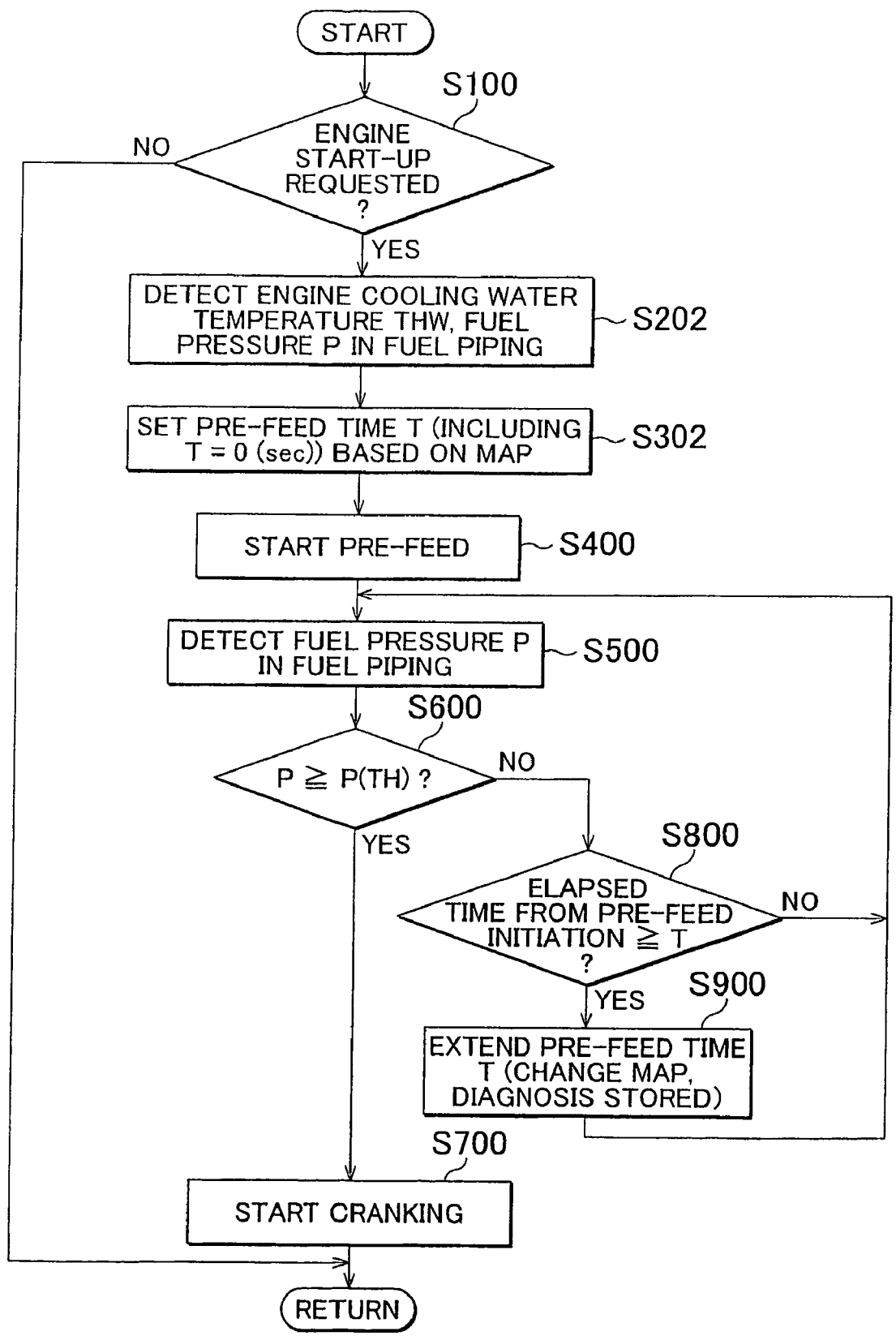
FIG. 9 is a flowchart showing a control structure of a program executed by an engine ECU that controls the fuel supply system that includes a start-up control device in accordance with of the second embodiment of the invention.

In the start-up control device in accordance with this embodiment, a map shown in FIG. 8 corresponding to FIG. 6 is stored in a memory of the engine ECU, and a program shown by a flowchart in FIG. 9 corresponding to FIG. 7 is executed by the CPU of the engine ECU. In the description of FIG. 8, the same contents as in FIG. 6 will not be described again. Likewise, in the description of FIG. 9, the same contents as in FIG. 7 will not be described again.

With reference to FIG. 8, a relationship between the temperature of fuel and the pressure of fuel in the piping will be described. In FIG. 8, changes in the temperature and the pressure of fuel when a warmed-up engine has been stopped and left are indicated by a solid-line curve. Furthermore, the solid-line curve in FIG. 9 is a saturated vapor pressure curve. In FIG. 8, fuel vapor does not occur in a region in which the pressure is above the saturated vapor pressure curve of the fuel represented by the solid line, and fuel vapor occurs in a region in which the pressure is below the saturated vapor pressure curve.

As shown in FIG. 8, with regard to this saturated vapor pressure curve of fuel, six regions in which a pre-feed time T is prescribed by the temperature of fuel (substituted by the engine cooling water temperature) and the temperature of fuel in this embodiment.

A region (1) is a region which is on the lower temperature side of the saturated vapor pressure curve of fuel, and in which the fuel pressure P is higher than a fuel pressure P(1). In the region (1), the pre-feed time T is 0 sec. The pre-feed time T being 0 sec means that the pre-feed is not be executed.

A region (2) is a region in which the fuel pressure P is lower than the fuel pressure P(1) and the temperature THW is lower than a temperature THW(3). In the region (1), the pre-feed time T is 0.5 sec.

A region (3) and a region (4) are regions in which the temperature THW is between THW(3) and THW(4) and the fuel pressure is lower than the fuel pressure P(1). Of these regions, the region (3) is a region that is on the higher-pressure side of the saturated vapor pressure curve of fuel, and the region (4) is a region that is on the lower-pressure side of the saturated vapor pressure curve of fuel. In the region (3), the pre-feed time T is 0.5 sec. In the region (4), the pre-feed time T is 2.0 sec.

The region (5) and the region (6) are regions in which the temperature THW is higher than THW(4) and which are on the higher-temperature side of the saturated vapor pressure curve of fuel. Of these regions, the region (5) is a region in which the fuel pressure P is higher than the fuel pressure P(1), and the region (6) is a region in which the fuel pressure P is lower than the fuel pressure P(1). In the region (5), the pre-feed time T is 0.5 sec. In the region (6), the pre-feed time T is 1.0 sec. Incidentally, in related-art start-up control devices, the pre-feed time T is uniformly 2.0 sec.

In the region (4), in which the pre-feed time T is the longest, the pressure of fuel has become low while the temperature of fuel is high, and therefore, reduced-pressure boiling is likely to occur. In this case, if the feed pump 100 is operated for a relatively short time of pre-feed (e.g., 0.5 sec to 1.0 sec), the pressure of fuel does not promptly rise since fuel vapor has occurred. At this time, a problem occurs in conjunction with the start-up characteristic of the engine. Therefore, by performing pre-feed for a relatively long time of 2.0 sec, the deterioration of the start-up characteristic can be avoided.

In the regions of the same temperature ranges, the higher the pressure of fuel, the less likely fuel vapor is to occur, and therefore the shorter the pre-feed time T is set.

Similarly to the map shown in FIG. 6, the map shown in FIG. 8 is a mere example, and the invention is not limited to the map nor the pre-feed time T of the map.

With reference to FIG. 9, a control structure of a program executed by the engine ECU, which is a start-up control device in accordance with this embodiment. The program (sub-routine) shown by the flowchart is repeatedly executed with a predetermined cycle time (e.g., 80 msec). In the following description, the same processes as in the flowchart (FIG. 7) of the first embodiment are affixed with the same step numbers. The contents of those processes are the same. Therefore, the description thereof will not be repeated.

In S202, the engine ECU detects an engine cooling water temperature THW and a fuel pressure P in the fuel piping. The engine cooling water temperature THW is detected on the basis of a signal input to the engine ECU from a water temperature sensor provided in a cooling water passageway for cooling engine. The fuel pressure P in the fuel piping is detected on the basis of a signal input to the engine ECU from a fuel pressure sensor provided in the high-pressure delivery pipe 112. In this embodiment, although the fuel temperature is substituted by the engine cooling water temperature THW, the invention is not limited to this construction.

In S302, the engine ECU sets a pre-feed time T on the basis of the map shown in FIG. 8, and the detected water temperature THW and the detected fuel pressure P. If at this time, the pre-feed time T is set at 0 sec, the pre-feed is not executed.

The action of the engine at the time of startup which is controlled by the engine ECU, which is the start-up control device in accordance with the embodiment, on the basis of the foregoing structure and the foregoing flowchart will be described.

If there is a request for start-up of the engine in a state of being left after being warmed up (YES in S100), the engine cooling water temperature THW and the fuel pressure P are detected (S20s). On the basis of this and the map shown in FIG. 8, it is judged which of the regions in FIG. 8 corresponds to the present condition, and the pre-feed time T is set (S302). Then, the pre-feed is started, and the fuel feed pump 100 is operated for the pre-feed time T (S400). At this time, if the detected temperature THW and the detected fuel pressure P are in the region (1), the pre-feed is not executed. Therefore, if an engine start-up request is detected (YES in S100), the fuel feed pump 100 is operated to start the cranking. Thus, the engine is started up. In the flowchart shown in FIG. 9, even if the pre-feed time T is set at 0 sec in S302, the fuel pressure P is detected (S500). If the fuel pressure P becomes equal to or higher than a fuel pressure threshold value PITH) (YES in S600), the cranking is started. However, the invention is not limited to these processes. For example, if the pre-feed time is set at 0 sec in S302, the process of S700 may be immediately performed.

When the pre-feed is performed, the fuel ejected by the fuel feed pump 100 pressurizes the fuel vapor occurring in the fuel piping so that the fuel vapor disappears. After that, the fuel pressure rises. After the fuel pressure P detected in the fuel piping becomes greater than or equal to a fuel pressure threshold value P(TH) (YES in S600), the cranking is started (S700). At this time, the fuel pressure has become equal to or higher than a pressure that allows good startup of the engine. Therefore, the engine is started up without occurrence of a bad startup of the engine.

Thus, the pre-feed time T is varied depending on the engine cooling water temperature THW and the fuel pressure P to execute the pre-feed (including the case where the pre-feed time T is 0 and the pre-feed is not performed). Therefore, it is possible to start up the engine without occurrence of bad start-up while avoiding the operation for the fuel feed pump 100 with an unnecessarily long pre-feed time.

Thus, according to the start-up control device of the engine in accordance with this embodiment, it is judged whether or not there is an amount of fuel vapor that truly affects the start-up characteristic of the engine, on the basis of the temperature of fuel and the fuel pressure. Then, the pre-feed is executed so that the pre-feed time is made longer the greater the degree of occurrence of the fuel vapor that affects the start-up characteristic of the engine. Therefore, the pre-feed performed for an unnecessarily long time can be avoided. Thus, the problem of useless shortening of the service life of the fuel feed pump, the problem of noise and vibration caused by the operation of the fuel feed pump during a stop of the engine, etc., can be avoided.

It is to be understood that the embodiments disclosed in this application are illustrative and not restrictive in any respect. The scope of the invention is shown not by the foregoing description but by the claims for patent, and is intended to cover all modifications within the meaning and scope equivalent to the claims for patent.

The invention claimed is:

1. A start-up control device of an internal combustion engine, the start-up control device comprising:
    a detector that detects a fuel temperature when a start-up of the internal combustion engine is requested; and
    a controller that pre-drives a fuel pump that supplies fuel, via a fuel piping, to a fuel injection valve that sends fuel into a combustion chamber of the internal combustion engine before the internal combustion engine is started up by injecting fuel from the fuel injection valve,
    wherein the controller divides the fuel temperature into fuel temperature ranges based on the detected fuel temperature, and sets a pre-feed time during which the fuel pump is pre-driven, for each of the fuel temperature ranges,
    wherein the fuel temperature ranges comprise:
        a first temperature range in which the fuel temperature is high;
        a third temperature range in which the fuel temperature is low; and
        a second temperature range between the first temperature range and the third temperature range,
    wherein, if it is judged that the detected fuel temperature falls in the second temperature range, then the controller judges that the degree of occurrence of fuel vapor that affects the start-up characteristic of the internal combustion engine is great, and controls the pre-feed time so that the pre-feed time for the second temperature range becomes relatively long compared to a pre-feed time for the first temperature range and the third temperature range.

2. The start-up control device of the internal combustion engine according to claim 1, wherein the detector further detects a fuel pressure,
    wherein the controller divides the fuel pressure into a plurality of fuel pressure ranges based on the detected fuel pressure, and
    wherein the detector sets a pre-feed time during which the fuel pump is pre-driven, for each of the fuel pressure ranges.

3. The start-up control device of the internal combustion engine according to claim 2, wherein the controller sets the pre-feed time so that the pre-feed time becomes long and drives the fuel pump in one of the fuel pressure ranges in which it is judged that the degree of occurrence of fuel vapor in the fuel piping which affects the start-up characteristic of the internal combustion engine is great.

4. The start-up control device of the internal combustion engine according to claim 3, wherein, if it is judged that the detected fuel temperature falls in a temperature range that is included in the second temperature range, and it is judged that the detected fuel pressure is on a low-pressure side of a saturated vapor pressure curve of the fuel, then the controller judges that the degree of occurrence of vapor that affects the start-up characteristic of the internal combustion engine is great, and controls the pre-feed time so that pre-feed time becomes relatively long.

5. A start-up control method of an internal combustion engine, the method comprising:
    detecting a fuel temperature when a start-up of the internal combustion engine is requested;
    dividing the fuel temperature into fuel temperature ranges based on the detected fuel temperature;
    setting a pre-feed time during which a fuel pump is pre-driven, for each of the fuel temperature ranges; and
    pre-driving the fuel pump that supplies fuel, via a fuel piping, to a fuel injection valve that sends fuel into a combustion chamber of the internal combustion engine before the internal combustion engine is started up by injecting fuel from the fuel injection valve,
    wherein the fuel temperature ranges comprise:
        a first temperature range in which the fuel temperature is high;
        a third temperature range in which the fuel temperature is low; and a second temperature range between the first temperature range and the third temperature range, wherein the method further comprises judging whether the detected fuel temperature falls in the second temperature range; and if it is judged that the detected fuel temperature falls in the second temperature range, then judging that the degree of occurrence of fuel vapor that affects the start-up characteristic of the internal combustion engine is great, and controlling the pre-feed time so that the pre-feed time for the second temperature range becomes relatively long compared to a pre-feed time for the first temperature range and the third temperature range.

6. The start-up control method of the internal combustion engine according to claim 5, the method further comprising:

detecting a fuel pressure;

dividing the fuel pressure into a plurality of fuel pressure ranges based on the detected fuel pressure; and setting a pre-feed time during which the fuel pump is pre-driven, for each of the fuel pressure ranges.

7. The start-up control method of the internal combustion engine according to claim 6, the method further comprising:

setting the pre-feed time so that the pre-feed time becomes long and driving the fuel pump in one of the fuel pressure ranges in which it is judged that the degree of occurrence of fuel vapor in the fuel piping which affects the start-up characteristic of the internal combustion engine is great.

8. The start-up control method of the internal combustion engine according to claim 7, the method further comprising:

if it is judged that the detected fuel temperature falls in a temperature range that is included in the second temperature range, and it is judged that the detected fuel pressure is on a low-pressure side of a saturated vapor pressure curve of the fuel, then:

judging that the degree of occurrence of vapor that affects the start-up characteristic of the internal combustion engine is great, and controlling the pre-feed time so that pre-feed time becomes relatively long.

* * * * *